Oct. 19, 1926.  
C. W. JOHNSON ET AL  
1,603,470  
METHOD OF MAKING BUSHINGS  
Filed June 19, 1920  2 Sheets-Sheet 1
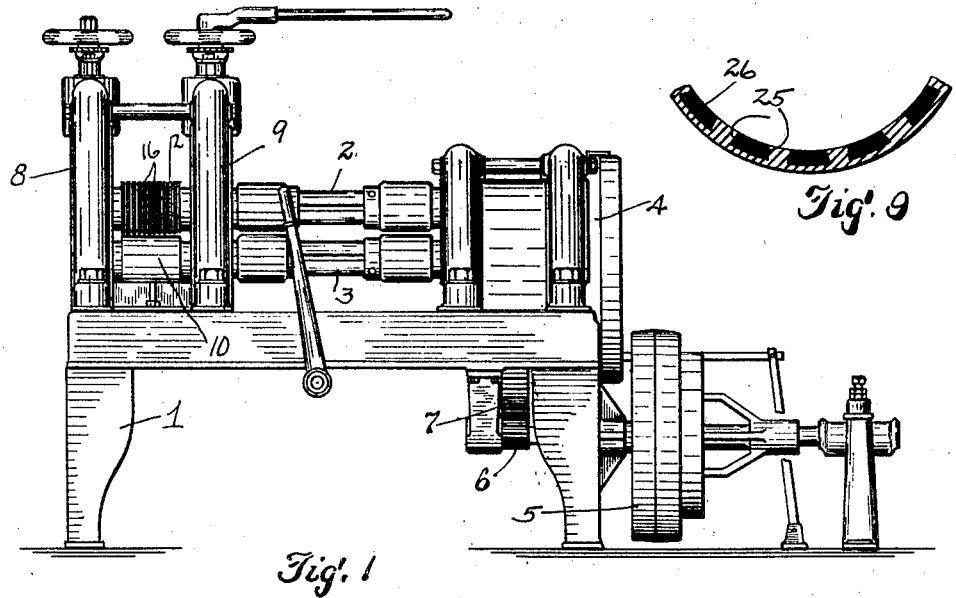
Fig. 1
Fig. 9
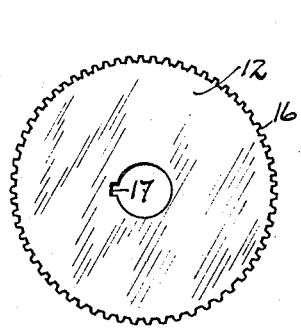
Fig. 2
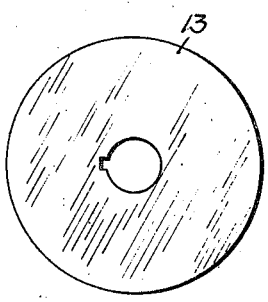
Fig. 3
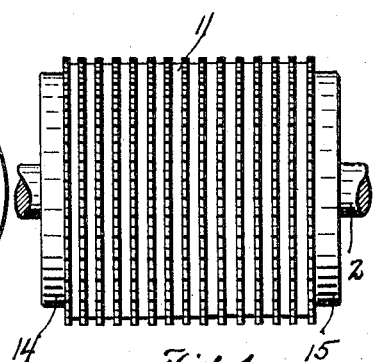
Fig. 4
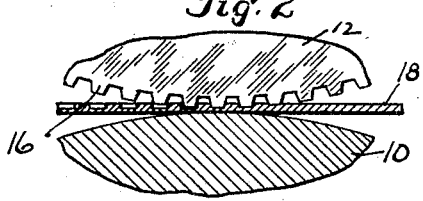
Fig. 5
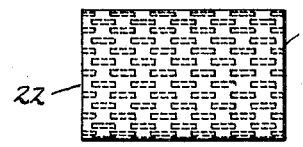
Fig. 6
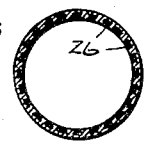
Fig. 7
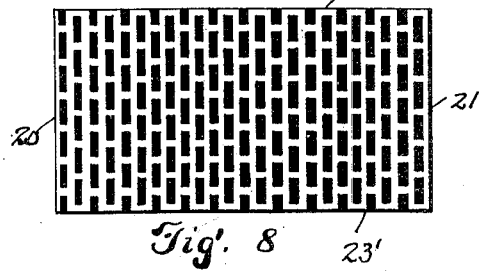
Fig. 8
INVENTOR
Carl W. Johnson and
James L. Myers,
Day, Oberlin & Day
ATTORNEYS Oct. 19, 1926.

C. W. JOHNSON ET AL 1,603,470

METHOD OF MAKING BUSHINGS

Filed June 19, 1920   2 Sheets-Sheet 2

Inventor
Carl W. Johnson and
James I. Myers
By Day, Oberlin & Day
Attorneys

Patented Oct. 19, 1926.

1,603,470

UNITED STATES PATENT OFFICE.

CARL W. JOHNSON AND JAMES L. MYERS, OF CLEVELAND, OHIO, ASSIGNORS TO THE CLEVELAND GRAPHITE BRONZE COMPANY, OF CLEVELAND, OHIO, A CORPORATION OF OHIO.

METHOD OF MAKING BUSHINGS.

Application filed June 19, 1920. Serial No. 390,188.

The present invention, relating, as indicated, to bushings and method of making the same, is more particularly directed to an improved type of self-lubricating bearing, consisting of a strip of relatively thin bearing material provided with an indented or otherwise recessed bearing surface in which lubricant, either in solid or liquid form, may be retained. The invention also relates to an improved apparatus for making such bushing, that is, for recessing or indenting the bearing surfaces of the metal strip in such a way as to provide recesses or indentations that are adapted to receive and mechanically lock therein solid and semi-solid lubricant. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 10:
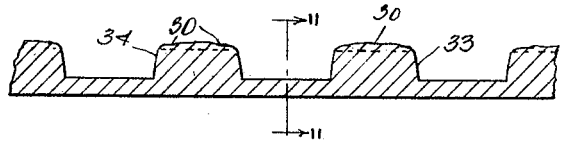
Figure 11:
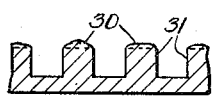
Figure 12:
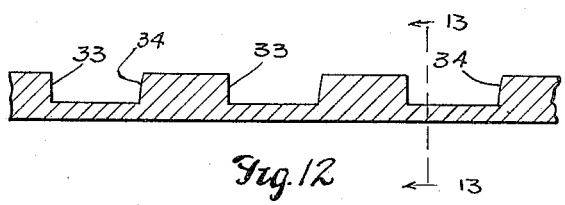
Figure 13:

Fig. 1 is a side elevation of our improved apparatus; Fig. 2 is a side elevation of one of the indenting disks; Fig. 3 is a similar view of one of the spacers interposed between the indenting disks; Fig. 4 is a front view of the intending roll as assembled; Fig. 5 is a partial transverse section through the rolls showing a strip of material between the same; Fig. 6 is a side elevation of a finished bushing; Fig. 7 is an end elevation of the same; Fig. 8 is a plan view of a strip of metal after being indented and filled with lubricant; Fig. 9 is a partial transverse section through the finished bushing; Fig. 10 is a section through the strip after the indenting operation; Fig. 11 is a section on the line 11—11, Fig. 10; Fig. 12 is a section similar to Fig. 10, but showing the strip after its passage through the sizing rolls; and Fig. 13 is a section on the line 13—13 in Fig. 12.

In Fig. 1 there is shown a rolling mill of well-known type consisting of a base 1, on which are housed two drive shafts 2 and 3, which are driven by suitable gears carried in a housing 4 and operated from a pulley 5 through gears 6 and 7. The construction of the rolling mill proper is not of great importance, as any standard type of rolling mill may be employed. The two shafts 2 and 3 extend longitudinally of the frame of the mill and are received in suitable bearings or frame members 8 and 9. The rolls are adapted to be mounted upon the forward ends of two shafts 2 and 3, which lie between the bearing containing housings 8 and 9, and the construction of the rolls is shown in Figs. 2, 3 and 4.

The lower roll 10 is carried on the forward end of the shaft 3 and may be a smooth surfaced roll, as shown in Fig. 1. The upper roll 11 performs the indenting operation on the metal strip and is a composite roll made up of a series of toothed disks 12 and intermediate spacing disks 13, arranged in intermediate relation. Each of the disks 12 and 13 is extremely thin and these disks are pressed closely together by means of adjustable collars 14 and 15 on the shaft 2, and the disks are so arranged that the teeth 16 on the disks 12 are disposed in staggered relation, as indicated in Fig. 4, and as evidenced by the arrangement of the recesses in the strip shown in Fig. 8. In order to secure this staggered relation of the teeth on the disks these disks are provided with key-ways 17, and the key-ways are formed in a slightly different position in some of the disks from the position in others. The key-way position will vary just sufficiently to prevent the indenting teeth from coming into alignment when the disks are assembled on the shaft 2, and in assembling them, the disks with the two types of key-ways will be arranged alternately, which will give a series of recesses in the strip being operated upon, which is shown in Fig. 8.

In the making of the improved type of bushing here described, a strip 18 of relatively thin rolled material, such as copper, brass or phosphor bronze, or other suitable bearing metal, will be passed between the rolls, which will be so positioned that they will produce indentations on the upper surface of the strip, and these indentations will extend approximately half way through the thickness of the strip. The teeth 16 on the indenting disks are formed like gear teeth and will roll themselves into and out of the indentations which they produce in the same manner that gear teeth roll into and out of engagement with other gear teeth with which they are in mesh, and this action will be evident from Fig. 5. The side walls of the indenting teeth 16 are perfectly parallel with each other, while the end walls of course are converging so that the recesses formed in the strip 18 will have two beveled walls, and two walls in parallelism, and the parallel walls will be those extending longitudinally of the strip that is passed between the rolls.

In Fig. 10 I have shown a strip after it has passed through the indenting rolls and have indicated the raised lands 30, which are produced between the indentations. In Fig. 11 I have shown a transverse section through one of the indentations showing the perfectly parallel and straight opposing walls 31. After the indentations have been produced the strip is passed between sizing rolls, which are smooth faced and which are adjusted to roll the strip to its original thickness. This action serves to flatten out the raised lands 30, and also to squeeze together the upper edges 32 of the previously parallel sides of the indentations, causing these indentations to overhang and the indentations to become dove-tailed in shape on this plane. The curved sides 33 and 34 of the original indentations, which are formed somewhat similar to gear teeth because of the rolling action of the indenting teeth when rolling into and out of the recesses, are brought by the sizing operation into the form shown in Fig. 12. In this figure the direction of movement of the strip between the rolls is indicated by the arrow, and the forward side of each recess has practically the same angle as before the sizing operation, while the rear side is brought to practically a right angle or vertical position due to the flow of the metal when the strip is passing between the sizing rolls.

After the strip has been indented, as shown in Fig. 8 it is then passed through a lubricating means which presses the mixture of graphite and the binder into the recesses on the face of the strip. The long strip of metal is then cut into shorter strips, approximately the size and shape of the strip shown in Fig. 8, in which the width of the strip is normally the circumference of the circled strip of bushing. That maintains the parallel side walls of the recesses or indentations running crosswise of the direction of movement of the shaft or member being journaled. The strips are then circled to bring the edges 20 and 21 of the strip together and provide a cylinder as shown in Figs. 6 and 7, in which the ends of the cylinders 22 and 23 are the edges 22' and 23' of the strip shown in Fig. 8.

The result of circling this strip in the direction indicated is to throw the parallel walls 25 of each recess slightly toward each other at their inner edges, as shown in Fig. 9, in this way transforming the straight wall grooves into dove-tail grooves, and mechanically locking the lubricant 26 into the indentations. A bushing of this character, manufactured in the manner described permanently holds the lubricant in the recesses and prevents any accidental dislodgment of the small pellets of graphite and binder even under excessive vibration and repeated blows such as bushings often receive when in use.

Other modes of applying the principle of our invention may be employed instead of the one explained, change being made as regards the steps or mechanism herein disclosed, provided the means stated by any of the following claims or the equivalent of such stated means be employed.

We therefore particularly point out and distinctly claim as our invention:—

1. In a method of making bushings, the combination of steps which consist in rolling a thin metal strip between rolls adapted to produce a series of spaced recesses and to also produce a series of raised lands between such recesses, rolling such strip between sizing rolls, thereby reducing such lands by causing the metal to flow and produce slightly overhanging edges in such recesses, filling such recesses with a solid lubricant under pressure, and then circling such strip into a cylindrical bushing.

2. In a method of making bushings, the steps which consist in passing a thin strip of metal beneath a roll having a series of indenting projections provided with two opposite parallel walls, then sizing such strip to produce overhanging edges on such previously parallel side walls of such recesses, and then forming said strip into a bearing for a movable shaft with such overhanging edges disposed transversely to the direction of movement of such shaft.

3. In a method of making tubular bushings, the steps which consist in rolling in a thin metallic strip a series of spaced recesses; rolling such strip between sizing rolls, thereby reducing the thickness of the metal surrounding such recess and causing a slight overhanging of the metal at the edges of the recess; filling such recess with a lubricant under pressure; and then circling such strip into a bushing, said circling operation causing the metal of the strip to mechanically lock said lubricant therein.

4. In a method of making bushings, the steps which consist in working the metal of a thin metallic strip by rolling it between rolls adapted to produce a series of spaced recesses therein and also to produce raised lands of greater thickness than the original strip between such recesses; rolling such strip between sizing rolls to further work the metal of such raised land portions whereby the thickness thereof is reduced and slight overhanging edges produced in such recesses; and then circling such strip into the bushing.

Signed by us, this 16th day of June, 1920.

CARL W. JOHNSON.
JAMES L. MYERS.